United States Patent
Seko

(10) Patent No.: US 7,325,563 B2
(45) Date of Patent: Feb. 5, 2008

(54) ELECTROMAGNETIC VALVE

(75) Inventor: Naohito Seko, Kariya (JP)

(73) Assignee: DENSO CORPORATION (JP)

( * ) Notice: Subject to any disclaimer, the term of this patent is extended or adjusted under 35 U.S.C. 154(b) by 0 days.

(21) Appl. No.: 11/412,933

(22) Filed: Apr. 28, 2006

(65) Prior Publication Data

US 2006/0243939 A1   Nov. 2, 2006

(30) Foreign Application Priority Data

May 2, 2005   (JP)   .............................. 2005-134120

(51) Int. Cl.
*F16K 49/00* (2006.01)
*F16L 53/00* (2006.01)

(52) U.S. Cl. .................. 137/341; 137/339; 251/129.15

(58) Field of Classification Search .......... 251/129.15; 137/339, 340, 341

See application file for complete search history.

(56) References Cited

U.S. PATENT DOCUMENTS

| 5,180,138 A * | 1/1993 | Moldenhauer ............ 251/30.05 |
| 5,246,199 A | 9/1993 | Numoto et al. |
| 5,941,502 A * | 8/1999 | Cooper ................... 251/129.15 |
| 6,347,616 B1 * | 2/2002 | Rodriguez et al. .......... 123/520 |
| 6,520,433 B2 * | 2/2003 | Miura et al. ............. 239/585.1 |
| 6,651,951 B2 * | 11/2003 | Krimmer et al. ............. 251/64 |

* cited by examiner

*Primary Examiner*—John Rivell
*Assistant Examiner*—John K. Fristoe Jr.
(74) *Attorney, Agent, or Firm*—Nixon & Vanderhye PC

(57) ABSTRACT

An electromagnetic valve generally has a housing, a valve element, an electromagnetic driving portion and a filter. The housing forms a fluid flow passage therein. The valve element is installed in the housing to control a flow of a fluid through the fluid flow passage. The electromagnetic driving portion is installed in the housing to generate a magnetic attraction force when it is energized to actuate the valve element. At least a part of the electromagnetic coil is within the fluid flow passage. The filter is installed in the fluid flow passage on an upstream side of the at least a part of the electromagnetic driving portion to filtrate the fluid flowing through the fluid flow passage.

13 Claims, 4 Drawing Sheets

ELECTROMAGNETIC VALVE

CROSS REFERENCE TO RELATED APPLICATION

This application is based upon and claims the benefit of priority of Japanese Patent Application No. 2005-134120 filed on May 2, 2005, the content of which is incorporated herein by reference.

1. Field of the Invention

The present invention relates to an electromagnetic valve that can effectively radiate the heat generated by an energized coil to a fluid flowing through the valve.

2. Background of the Invention

Conventionally, an electromagnetic valve 100, which has a valve seat 104 that is seated on and lifted off a valve seat 102 of a housing 101 to control a fluid flow quantity through a fluid flow passage 103, and a coil 105 that generates a magnetic attraction force when energized to drive the valve element 104 to a valve-opening side as shown in FIG. 5, is provided (refer to U.S. Pat. No. 5,246,199 and its counterpart JP-05-39882-A, for example). The electromagnetic driving portion is formed from: a stator core 106 that is magnetized when the coil 105 is energized; a fixed core such as a yoke 107, a magnetic plate 108, etc.; a moving core 109 that forms a magnetic circuit together with the coil 105, the stator core 106 and the yoke 107; a piece 110 that limits a traveling distance of the moving core 109; and a resin case 112 that covers and protects radially outer sides of the coil 105 and the resin bobbin 111. The electromagnetic driving portion distributes exciting current via the terminal 113 to the coil 105 so that the coil 105 generates the magnetic attraction force to attract the moving core 109 to an attracting portion of the stator core 106, to open and close the valve element 104, which moves integrally with the moving core 109.

An electric energy supplied to the coil 105 is transformed not only into magnetic energy but also into heat energy. That is, the coil 105 is energized to drive the electromagnetic valve 100, so that the coil 105 generates heat due to electrical resistance. A longer energization of the coil 105 causes a larger temperature increase of the coil 105. Then, a resistance of the coil 105 increases in accordance with the temperature increase of the coil 105, to decrease a current flowing through the coil 105 and the magnetic attraction force of the moving core 109. This causes an issue of an unevenness increase of flow quantity characteristics in accordance with a decrease of a control response performance, that is, an increase of an operating voltage.

The coil 105 is a surface insulated lead wire (copper wire) wound on a circumference of a resin bobbin 111. The moving core 109 is slidably supported in a sliding bore of the magnetic plate 108. A lubricant is put on a surface of a sliding portion of the moving core 109, and a surface treatment such as a plating is applied to a surface of the sliding bore of the magnetic plate 108. Thus, the temperature increase of the coil 105 causes a larger heat deterioration of magnetic circuit components such as the lead wire, the resin bobbin 111, the magnetic plate 108, the moving core 109, etc. Specifically, an excessive temperature increase larger than a limit temperature of resinous parts such as insulating coatings, the resin bobbin 111, etc. and/or a falling off of the lubricant and the plating layers can decrease a reliability of the electromagnetic driving portion.

U.S. Pat. No. 5,246,199 and its counterpart JP-05-39882-A disclose the electromagnetic valve 106 in which the coil 105 is located apart from the fluid flow passage. The electromagnetic valve 100 cannot efficiently radiate a heat generated in the energized coil 105 to the fluid flowing through the fluid flow passage. The radiation of the heat of the coil 105 depends on a surface area of the coil 105, so that it is necessary to upsize the coil 105 to radiate the heat efficiently and to secure a performance of the electromagnetic valve 100 even when the fluid flowing around the coil is stagnant. The heat radiation area is increased by installing a heatsink for air-cooling the coil 105 on an outer surface of a resin vase 112 of the electromagnetic valve 100 or extending a surface area of the coil 105. However, these constructions increase a size of the electromagnetic driving portion and the electromagnetic valve 100. Conversely, a downsizing of the coil 105 decreases the surface area of the coil 105 and the heat radiation performance of the electromagnetic valve 100, to cause the above-described issues.

SUMMARY OF THE INVENTION

The present invention is achieved in view of the above-described issues, and has an object to provide an electromagnetic valve that can efficiently radiate the heat generated in the coil to a fluid flowing through the fluid flow passage. Another object of the present invention is to provide an electromagnetic valve that has a fine heat radiation performance without upsizing the coil.

The electromagnetic valve generally has a housing, a valve element, an electromagnetic driving portion and a filter. The housing forms a fluid flow passage therein. The valve element is installed in the housing to control a flow of a fluid through the fluid flow passage. The electromagnetic driving portion is installed in the housing to generate a magnetic attraction force when it is energized to actuate the valve element. At least a part of the electromagnetic coil is within the fluid flow passage. The filter is installed in the fluid flow passage on an upstream side of the at least a part of the electromagnetic driving portion to filtrate the fluid flowing through the fluid flow passage.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
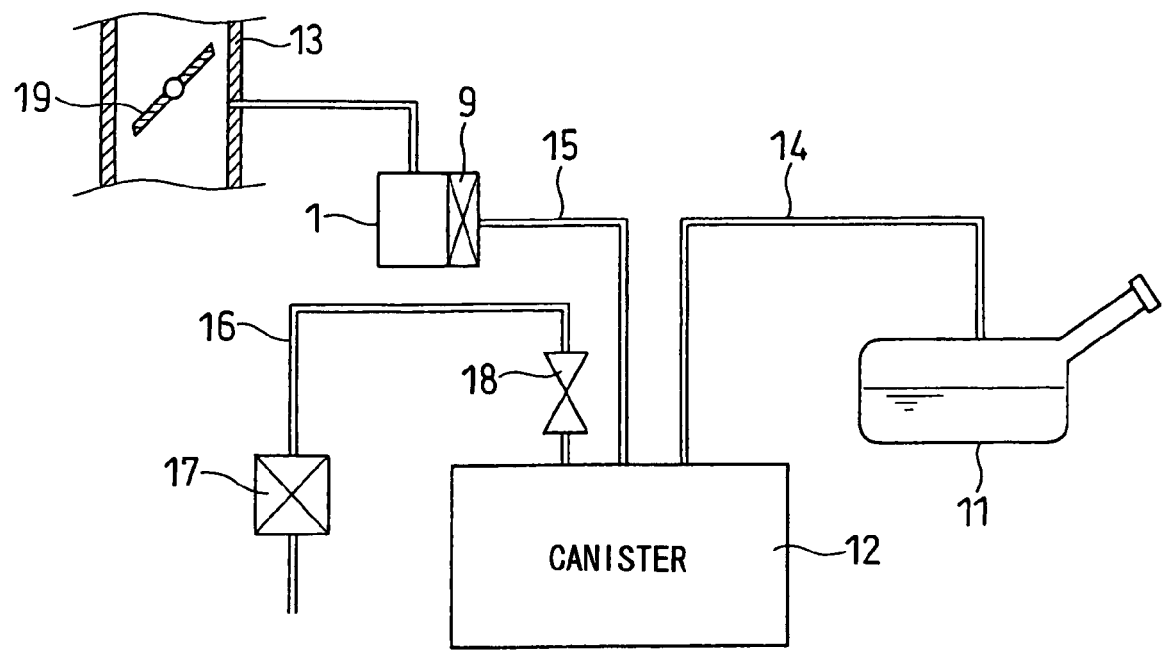
FIG. 1 is a schematic diagram showing an entire construction of an evaporative emission control system that has an electromagnetic valve according to a first embodiment of the present invention.

In a first embodiment of the present invention, an electromagnetic valve 1 has a coil-cooling function to radiate a heat generated by a solenoid coil 2 to a fluid flowing through a fluid flow passage formed in a housing 3, to cool the solenoid coil 2 efficiently. The electromagnetic valve 1 is incorporated in an evaporative emission control system. The evaporative emission control system prevents the fluid such as vaporized fuel, which is vaporized (volatilized) in a fuel tank 11 of the vehicle, from flying off into the atmosphere by recovering the fluid such as vaporized fuel through a canister 12 into an engine intake pipe 13 of an internal combustion engine (hereinafter referred to as engine) such as a gasoline engine, by using negative pressure in the engine intake pipe 13. In the evaporative emission control system, a fluid introduction passage 14 communicates the fuel tank 11 with the canister 12, and another fluid introduction passage (purge line) 15 communicates the canister 12 with the engine intake pipe 13.

The fuel tank 11 is provided with an in-tank pressure sensor (not shown) to detect an in-tank pressure in the fuel tank 11. In the canister 12 is installed adsorbent such as activated carbon to adsorb the fluid such as vaporized fuel. A vent pipe 16 is connected to a vent hole (vent port) of the canister 12. On the way of the vent pipe 16 are provided: a filter 17 that filtrates the gas flowing into the canister 12; and a canister control valve 18 that is a normally-opened electromagnetic opening/closing valve that closes the vent hole of the canister 12 as demanded. The filter 17 passes the gas flowing from an inlet portion (the vent hole) of the vent pipe 16 and traps foreign matters contained in the gas to prevent the foreign matters from entering into the engine intake pipe 13. The electromagnetic valve 1 has a mesh filter 9 therein, so that it is possible to eliminate the filter 17 on the way of the vent pipe 16.

Further, in the engine intake pipe 13 is installed a throttle valve 19 that adjusts an amount of intake gas fed to an intake gas passage communicated with respective combustion chambers of the engine. On the way of the fluid introduction passage 15 is installed the electromagnetic valve 1. The fluid introduction passage 15 is communicated with the engine intake pipe 13 at a position downstream the throttle valve 19 in the airflow direction of the intake gas (at the side of an intake port of the engine). The leakage of the fluid such as vaporized fuel is checked in accordance with the following procedure. Firstly, the canister control valve 18 closes the vent hole of the canister 12. Next, the electromagnetic valve 1 opens to introduce the negative pressure in the engine intake pipe 13 to the fluid introduction passage 15 and the canister 12, and then the electromagnetic valve 1 closes to completely interrupt the fluid such as vaporized fuel. After a predetermined period of time is elapsed after the electromagnetic valve 1 is closed, the in-tank pressure sensor detects the in-tank pressure in the fuel tank 11 to detect the in-tank pressure is increased or not, to check the leakage of the fluid such as vaporized fuel.

In the following is described a construction of the electromagnetic valve 1 according to the first embodiment, referring to FIGS. 1 to 4. The electromagnetic valve 1 is a purge duty vacuum switching valve (VSV) that is installed on the way of the evaporative emission control system to adjust a purge flow quantity of the fluid such as vaporized fuel introduced from the canister 12 to the engine intake pipe 13. In the electromagnetic valve 1, an engine control unit (ECU) controls an energizing time of the solenoid coil 2 of the electromagnetic valve 1 via an electromagnetic valve driving circuit, to adjust a purge flow quantity of the fluid such as vaporized fuel introduced from the canister 12 to the engine intake pipe 13. On the way of the connection pipe 16 is installed a purge control valve 21 that adjusts purge amount of the fluid such as vaporized fuel. The ECU has a built-in conventional microcomputer, to control a duty ratio, i.e., on time versus off time in energizing the solenoid coil 2 of the electromagnetic valve 1, so as to adjust the purge flow quantity of the fluid such as vaporized fuel introduced from the canister 12 to the engine intake pipe 13.

The electromagnetic valve 1 is installed on the way of the fluid induction passage 15. The electromagnetic valve 1 includes the housing 3, in which the fluid flow passage is formed, a valve element 6, an electromagnetic driving portion, a coil spring 8 and a mesh filter 9. The valve element 6 controls a passage of the fluid such as vaporized fuel through the fluid flow passage. The electromagnetic driving portion has the solenoid coil 2, which generates a magnetic attraction force when it is energized. The coil spring generates a spring force to urge the valve element 6 to a valve-closing side. The mesh filter 9 has a sheet-like shape and is installed in the housing 3.

The housing 3 is formed from a valve case 4 and a valve seat 5. The valve case 4 houses the valve element 6 therein to be able to open and close. The valve seat 5 has a valve seat portion 20, onto which the spring force of the coil spring 8 pushes the valve element 6. The housing 3 is integrally formed from thermoplastic resin such as polybutylene telephthalate (PBT), polyphenylene sulfide (PPS), or polyamide resin (PA), for example.

Figure 2:
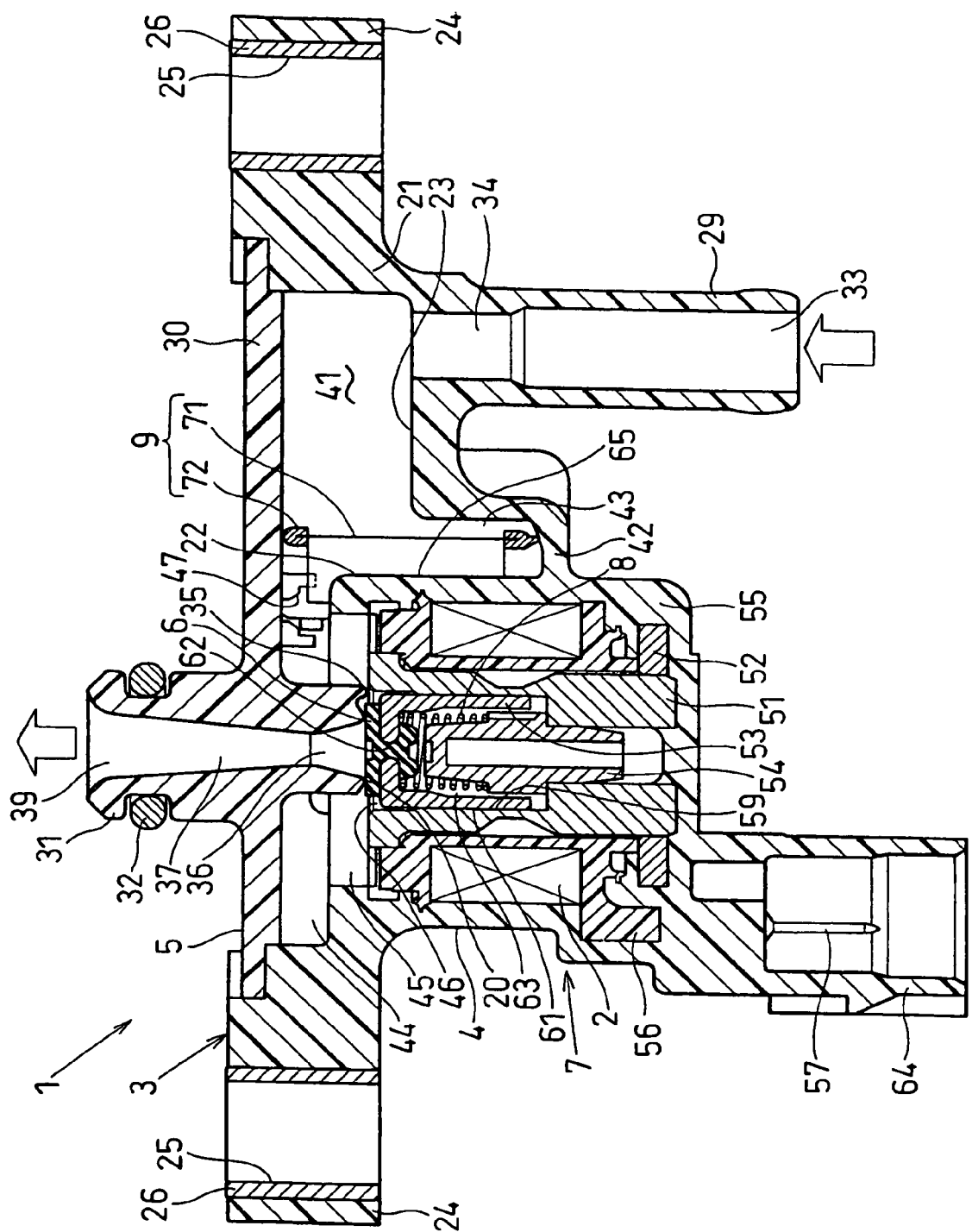
FIG. 2 is a cross-sectional view showing an entire construction of the electromagnetic valve according to the first embodiment.

The valve case 4 is integrally formed from a sidewall portion 21, a cylindrical portion 22 and a shelf portion 23. As shown in FIG. 2, the sidewall portion 21 forms an exterior wall of the electromagnetic valve 1. The cylindrical portion 22 is provided on a radially inner side of the sidewall portion 21. The shelf portion 23 connects the sidewall portion 21 integrally with the cylindrical portion 22. A pair of attachment stays 24 extend radially outward from an opening end side portion of the sidewall portion 21. A collar 26 is provided in each the attachment stay 24 by insert molding. The collar 26 has an insertion hole 25 for inserting a fastener such as a bolt therein. The attachment stays 24 are fastened, for example, on the engine intake pipe (throttle body) 13, the canister 12, or a cylinder head cover or an air cleaner of the engine with fasteners. Alternatively, the valve seat 5 may have attachment stays to be attached on the canister 12, or the cylinder head cover or the air cleaner of the engine. Stiffening ribs 27 are formed on a surface of the attachment stays 24, and stiffening ribs 28 are formed on a bottom surface of the shelf portion 23. A round pipe-shaped fluid flow passage pipe (inlet pipe) 29 protrudes from the shelf portion 23 in parallel with a center axis of the electromagnetic valve 1.

An approximately planar ring-shaped slab top portion 30 and an approximately round pipe-shaped fluid flow passage pipe (outlet pipe) 31 are integrally formed in the valve seat 5. The slab top portion 30 is welded, tightened or swaged onto a connection portion 21a, which is an upper end side flange portion of the sidewall portion 21 in FIG. 2. The fluid flow passage pipe 31 extends from an inner circumferential portion of the slab top portion 30 in a direction of a center axis of the electromagnetic valve 1, i.e., in the vertical direction of FIG. 2. The slab top portion 30 serves as a lid to block an opening end of the sidewall portion 21. The fluid flow passage pipe 31 is located on the center axis of the electromagnetic valve 1. An O-ring 32 is fitted on an outer circumference of the fluid flow passage pipe 31 to secure an airtightness between a pipe fitting (not shown) and the fluid flow passage pipe 31.

The fluid flow passage pipe 29 is communicated via an upstream portion of the fluid introduction passage 15 to the canister 12. The fluid flow passage pipe 29 forms a fluid-introducing flow passage (fluid flow passage, canister-side flow passage) 34, which includes an inlet port 33, therein. The fluid flow passage pipe 29, which forms the fluid-introducing flow passage 34, has an approximately straight pipe shape. The fluid flow passage pipe 31 is provided with a plurality of ribs 35 on its outer circumference at the side of the electromagnetic driving portion, to prevent the valve element 6 from being damaged in a shipping and/or transferring time of the electromagnetic valve 1.

A circular ring-shaped valve seat portion 20 is integrally formed on a peripheral portion of an opening of the fluid flow passage pipe 31 at the side of the electromagnetic driving portion, to seat the valve element 6 thereon. The valve seat portion 20 is so formed as to provide a clearance between a seat surface of the valve element 6 and itself to flow the fluid therethrough when the valve element 6 is lifted off the valve seat portion 20. The clearance also serves as an orifice that has a quite small flow passage cross-sectional area in the fluid flow passage formed in the housing 3, to increase a velocity of the fluid flow therethrough. A valve hole 36 is formed in the valve seat portion 20, to be opened and closed by the valve element 6. The fluid flow passage pipe 31 is communicated via a downstream portion of the fluid introduction passage 15 to the engine intake pipe 13. The fluid flow passage pipe 31 forms a fluid-discharging passage (fluid flow passage, intake pipe-side flow passage) 37, which includes an outlet port 39, therein. An inner diameter of the fluid-discharging passage 37 gradually increases as going from an upstream side to a downstream side in the fluid flow direction.

Figure 3:
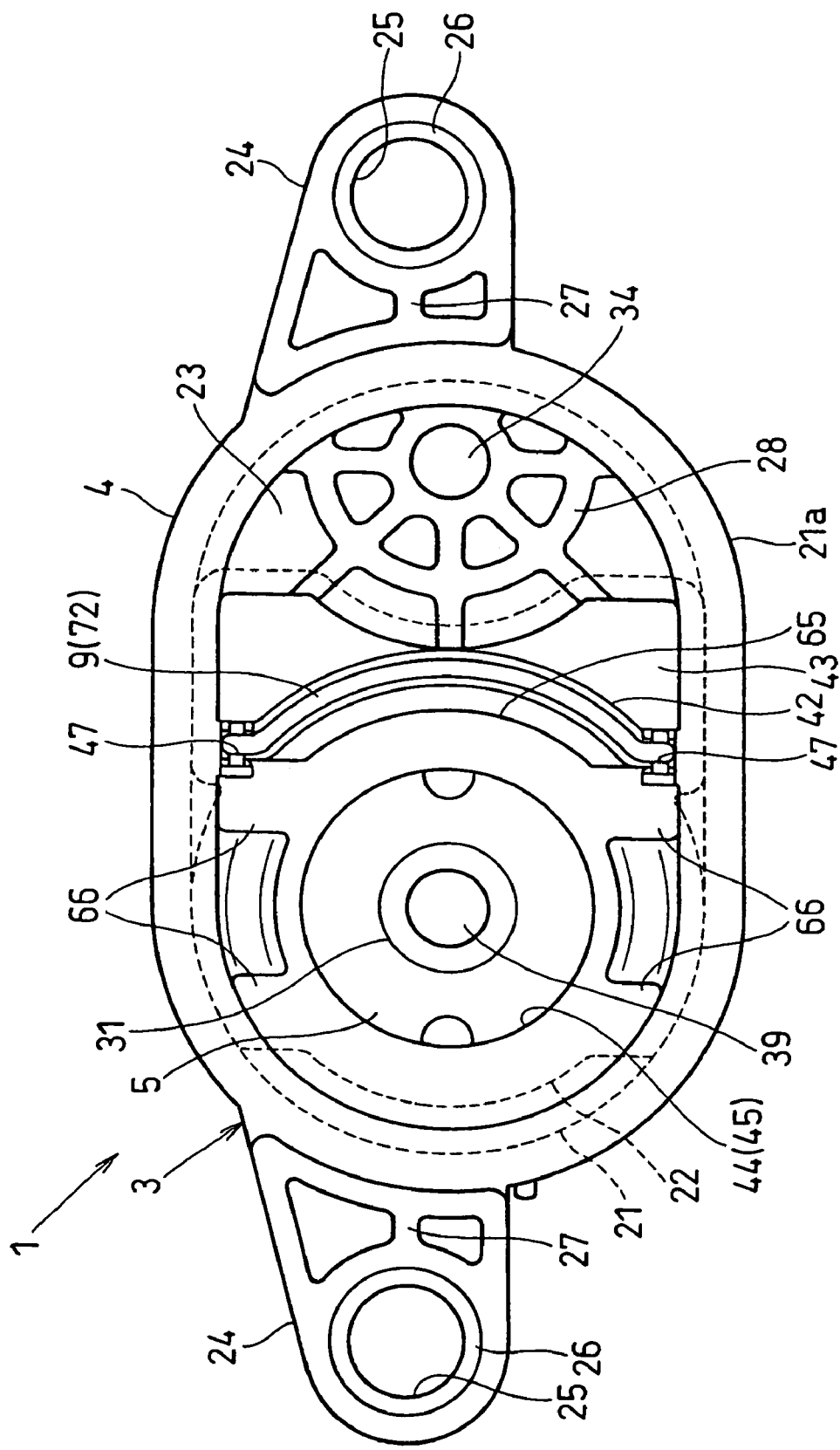
FIG. 3 is a plan view showing a filter and a valve case of the electromagnetic valve according to the first embodiment.
Figure 4:
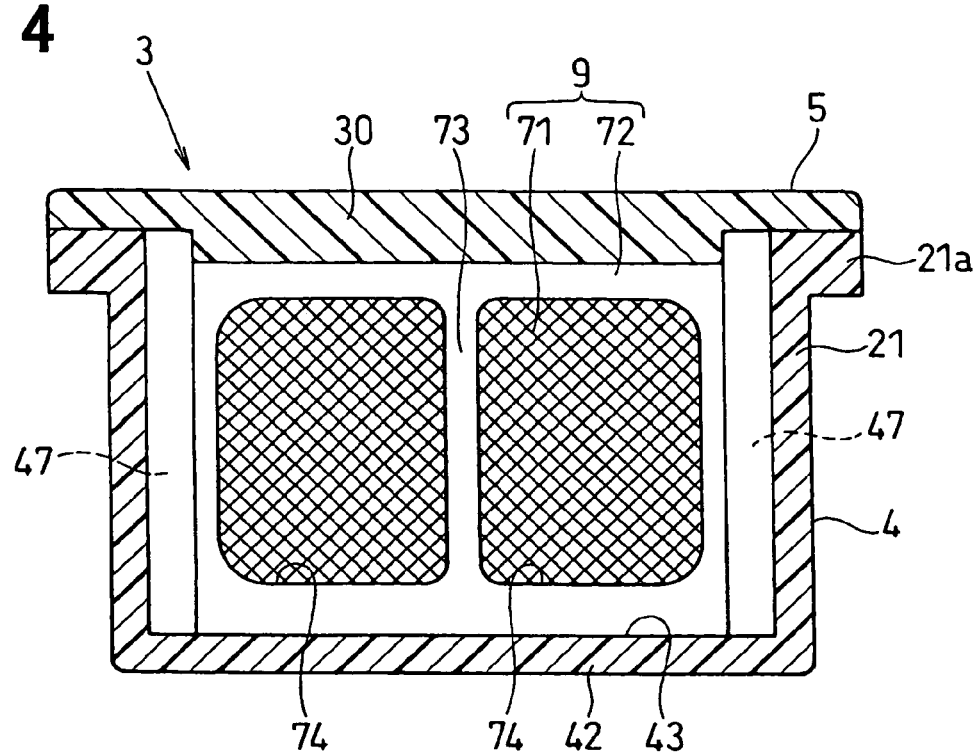
FIG. 4 is a cross-sectional view showing the filter and the valve case of the electromagnetic valve according to the first embodiment.
Figure 5:
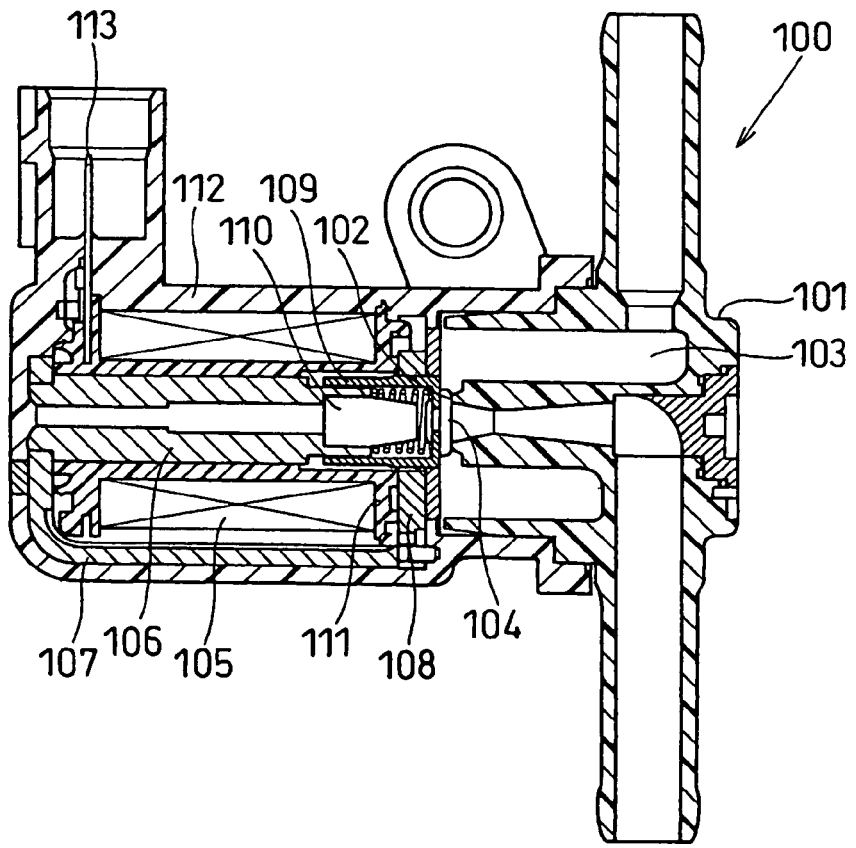
FIG. 5 is a cross-sectional view showing an entire construction of a conventional electromagnetic valve.

A side surface, or an interior wall surface of the sidewall portion 21 of the valve case 4, a bottom surface of the shelf portion 23 and a ceiling surface of the slab top portion 30 of the valve seat 5 define a chamber 41 therein. The chamber 41 has a flow passage cross-sectional area larger than that of the fluid-introducing flow passage 34, and occupies a relatively large volume in the fluid flow passage formed in the housing 3. The chamber 41 is located on the upstream side of the mesh filter 9 in the fluid flow direction. A depressed portion 42 is formed between the cylindrical portion 22 and the shelf portion 23 of the valve case 4. As shown in FIGS. 2 to 4, the depressed portion 42 is defined by the side surface, or the interior wall surface and a bottom surface of the sidewall portion 21. The depressed portion 42 and the ceiling surface of the slab top portion 30 of the valve seat 5 define an approximately rectangular filter-housing space (fluid flow passage) 43 therein. The mesh filter 9, which has a curved surface corresponding to a cylindrical surface of the cylindrical portion 22, partitions the filter-housing space 43 into an upstream portion and a downstream portion.

The downstream portion of the filter-housing space 43, which has an arc-like shape corresponding to the cylindrical surface of the cylindrical portion 22, is communicated via annular spaces (fluid flow passages) 44, 45 with a valve chamber 46 that houses the valve element 6. As shown in FIGS. 2 and 3, an opening end rim portion, or an upper end surface of the cylindrical portion 22 of the valve case 4, the ceiling surface of the slab top portion 30 of the valve seat 5 and a cylindrical outer circumferential surface of the fluid flow passage pipe 31 define the annular space 44 therein. A leading end surface of the electromagnetic driving portion, i.e., an upper end surface of an after-mentioned stator core 51 in FIG. 2, and an opening end surface, or an inner circumferential surface of the cylindrical portion 22 of the valve case 4 and the outer circumferential surface of the fluid flow passage pipe 31 define the annular space 45 therein. The depressed portion 42 is provided with a pair of approximately straight fitting groove (depressed groove) 47 therein, to extend perpendicularly to the fluid flow direction. The mesh filter 9 is inserted in a pair of the fitting grooves 47, to seal a gap between the mesh filter 9 and themselves.

As shown in FIGS. 2 and 3, the fluid flow passage of the housing 3 is formed from: the inlet port 33; the fluid-introducing flow passage 34; the chamber 41; the filter-housing space 43; the annular space 44; the annular space 45; the valve chamber 46; the valve hole 36; the fluid-discharging flow passage 37 and the outlet port 39. Specifically, a first fluid introduction passage is formed from: the inlet port 33; the fluid-introducing flow passage 34; the chamber 41; the filter-housing space 43; the annular space 44; the annular space 45; and the valve chamber 46, to introduce the fluid to a valve portion of the electromagnetic valve 1, i.e., the valve hole 36. A second fluid introduction passage is formed from: the inlet port 33; the fluid-introducing flow passage 34; and the chamber 41, to introduce the fluid to the filter-housing space 43. A third fluid introduction passage is formed from: the inlet port 33; and the fluid-introducing flow passage 34, to introduce the fluid to the chamber 41.

The valve element 6 is a rubber seal valve that is formed from elastic rubber substance such as fluorine rubber or silicone rubber. The valve element 6 is integrally fixed on a moving portion of the electromagnetic driving portion such as an after-mentioned moving core 53. The valve element 6 is baked, rubber molded, rubber printed or press-fitted on the moving portion. The valve element 6 is installed to reciprocate in the valve chamber 46 in the axial direction. The valve element 6 has a rubber seal portion that protrudes upward from an upper end surface of the moving portion of the electromagnetic driving portion, and a rubber cushion portion that protrudes downward from a lower end surface of the moving portion in FIG. 2. The rubber seal portion is to be seated on the valve seat portion 20 of the valve seat 5 to seal the valve hole 36.

The electromagnetic driving portion is an electromagnetic actuator that generates a magnetic attraction force (magnetomotive force) when it is supplied with an exciting current. The electromagnetic driving portion is formed from the solenoid coil 2, a fixed core including a stator core 51, a yoke 52, etc., the moving core (moving portion) 53, a piece 54 and a resin case 55. The solenoid coil 2 generates a magnetic flux around itself when it is energized, to excite the fixed core, i.e., the stator core 51, the yoke 52, etc. The moving core (moving portion) 53 forms an electromagnetic circuit together with the solenoid coil 2, the stator core 51 and the yoke 52. The piece 54 limits an axial traveling distance of the valve element 6, the moving core 53, etc. The resin case 55 covers and protects a radially outer side of the coil assembly 7.

The solenoid coil 2 is installed in the fluid flow passage of the housing 3. The solenoid coil 2 has: a coil portion that is a resinous insulator-coated conducting wire repeatedly wound on a coil bobbin 56; and a pair of lead wires that are led out of the coil portion. The resin case 55 covers and protects the radially outer side of the coil portion of the solenoid coil 2. A pair of the lead wires are electrically connected to a pair of external connection terminals 57, which is electrically connected to an electromagnetic valve driving circuit, by swaging, welding, etc.

The solenoid coil 2 generates a magnetomotive force when it is energized, to magnetize the respective magnetic substances (the stator core 51, the yoke 52, the moving core 53, etc.), to drive the valve element 6 and the moving core 53 to a valve-opening side to open the valve hole 36. The coil bobbin 56 is a primary resin cast, specifically a cylindrical resin bobbin, which is resin formed (mold formed) antecedent to the resin case 55 and housed in a cylindrical coil-housing portion that is formed between an outer circumference of the stator core 51 and an inner circumference of the resin case 55. The solenoid coil 2 forms the coil assembly 7 in conjunction at least with the resin case 55 and the coil bobbin 56. The coil assembly 7 may further include a pair of the terminals 57 that are in electrical connection with a pair of the lead wires led out of the coil portion of the solenoid coil 2.

The stator core 51 is formed from a magnetic material into a cylindrical shape, and magnetized to be an electromagnet while the solenoid coil 2 is energized. The stator core 51 has an attracting portion, which is a stepped portion formed between a large diameter cylindrical portion and a small diameter cylindrical portion, to attract the moving core 53 to one axial side. The large diameter cylindrical portion of the stator core 51 is provided with a sliding bore 59 that slidably supports the moving core 53. A surface of the sliding bore 59 of the stator core 51 may be finished with a nickel phosphate plating (Ni—P plating), a diamond like carbon (DLC) etc. and/or heat-treated. In the first embodiment, the fixed core is formed from the stator core 51, the yoke 52, etc. Alternatively, the fixed core may be formed only from the stator core 51. The fixed core may be formed by combining any one of a magnetic plate and the yoke 52 with the stator core 51.

The moving core 53 is formed from magnetic material into a cup-like shape. The moving core 53 is magnetized to become an electromagnet to be attracted to the attracting portion of the stator core 51 when the solenoid coil 2 is energized. When the solenoid coil 2 is not supplied with exciting current, the spring force of the coil spring 8 pushes the moving core 53 and the valve element 6 onto the valve seat portion 20 of the fluid flow passage pipe 31 of the valve seat 5, that is, to a valve-closing side to close the valve hole 36, or to the other side in the direction of the center axis.

The moving core 53 has a cylindrical sliding portion 61 that is slidably supported in the sliding bore 59 of the stator core 51. One end side of the sliding portion 61 is closed, and the other end side is opened. A through hole 62 is formed on a disk-shaped block portion, which is provided on the one end side of the sliding portion 61, to penetrate the block portion in the axial direction. A valve element 6 is attached to block the through hole 62. The moving core 53 is fitted to an outer circumference of the piece 54, to be slidable in an inner circumference of the large diameter cylindrical portion of the stator core 51. A cylindrical space formed between the moving core 53 and the piece 54 serves as a spring chamber 63 that houses the coil spring 8 therein. The moving core 53 is slidably supported in the sliding bore 59 of the stator core 51. A coating of lubricant such as fluorine resin, polytetrafluoroethylene: PTFE, etc. may be put on a surface of the sliding portion 61.

The piece 54 is press-fitted to and held by the small diameter cylindrical portion of the stator core 51. A limiting surface is provided on a leading end surface, or an upper end surface in FIG. 2 of the piece 54, to be engaged with the valve element 6 or the moving core 53 when the valve element 6, the moving core 53 etc. has moved to the one side in the axial direction by their maximum traveling distance, or their maximum lifting height. Thus, the limiting surface prevents the moving portion from moving further to the valve-opening side. The rubber cushion portion of the valve element 6 absorbs an impact when the valve element 6 comes in contact with the limiting surface of the piece 54, and reduces a contact noise of the moving core 53.

The resin case 55 is a secondary resin cast that is resin formed (mold formed) subsequent to the resin molding of the coil bobbin 56. The resin case 55 is integrally formed on a lower side of the cylindrical portion 22 of the valve case 4 in FIG. 2. That is, the resin case 55 is formed at the same time as the valve case 4 is resin formed. A tube-shaped male connector shell 64 is integrally formed on an outer circumferential portion on a lower end side of the resin case 55 in FIG. 2, to hold a pair of the terminals 57 for supplying exciting current to the solenoid coil 2. Leading end portions of a pair of the terminal 57 are exposed in the connector shell 64, to serve as connector pins, which are inserted in and electrically connected to a female connector portion at a side of an external power source or at a side of the electromagnetic valve driving portion.

The resin case 55 has a heatsink portion 65 that is exposed to radiate heat to the filter-housing space (fluid flow passage) 43 of the housing 3. As shown in FIGS. 2 and 3, the heatsink portion 65 is located in the fluid flow passage of the housing 3, and integrally formed on the cylindrical outer circumferential surface of the cylindrical portion 22, which covers the radially outer side surface of the coil assembly 7, that is, the radially outer side surface of the coil portion of the solenoid coil 2. The heatsink portion 65 forms a part of a cylindrical surface along an outer circumference of the coil portion of the solenoid coil 2, that is, the radially outer side surface of the coil portion of the solenoid coil 2, to radiate the heat generated in the solenoid coil 2 to the fluid flowing through the fluid flow passage of the housing 3. The heatsink portion 65 is provided with a plurality of approximately rectangular protruding portions 66 that protrude perpendicularly to the fluid flow direction in the fluid flow passage of the housing 3. The heatsink portion 65 may be provided with a number of heat radiation fins to extend a heat radiation area of the heatsink portion 65.

The coil spring 8 is housed in the spring chamber 63 that is formed between the moving core 53 and the piece 54. The coil spring 8 serves as a valve element urging means that generates a spring force to push the valve element 6 onto the valve seat portion 20. One axial end of the coil spring 8 is supported by a housing side hook of the piece 54, and the other axial end of the coil spring 8 is supported by a valve side hook of the moving core 53.

As shown in FIGS. 2 to 4, the mesh filter 9 in the first embodiment is arranged to cover at least a part of the radially outer side surface, or the cylindrical outer circumferential surface the coil portion of the solenoid coil 2, that is, to cover at least a part of the cylindrical surface of the cylindrical portion 22 of the valve case 4 and the heat radiation surface of the heatsink portion 65 of the resin case 55 in a circumferential direction. Thus, the mesh filter 9 is arranged in the filter-housing space 43 of the housing 3 so that a cross-sectional shape of the mesh filter 9 is convexly curved toward the upstream side of the fluid flow direction and approximately perpendicular to the fluid flow direction in the housing 3.

The mesh filter 9 is formed from: an approximately rectangular mesh sheet 71 through which the fluid can pass;

and a filter frame 72 that supports an outer circumferential rim of the mesh sheet 71 and is fitted to and supported by the housing 3. The mesh filter 9 has a curved surface that is curved in a horizontal direction in parallel to a pair of opposite sides, i.e., a top and bottom sides of the filter frame 72, that is, and not curved in a vertical direction in parallel to another pair of opposite sides, i.e., a left and right sides of the filter frame 72.

The mesh sheet 71 is a filter element that filtrates the fluid such as vaporized fuel, which flows in the fluid flow passage of the housing 3 to the valve, to capture foreign matters contained in the fluid such as fine particles of adsorbent that is supported by the canister 12 and reduced by a vibration of the engine into fine powder, dust in the air that enters in the fuel tank 11 during refueling, dust in the air that enters through the vent hole of the canister 12, etc., to clean the fluid. The mesh sheet 71 has a relatively large passage resistance in the fluid flow passage of the housing 3, to spread the fluid, which has flown from the upstream side, over an entire surface of the mesh sheet 71. The mesh sheet 71 is formed from resinous material such as polyamide resin: PA, and integrally formed in the filter frame 72 by insert molding. The mesh sheet 71 may be formed from resinous expanded net or metallic net.

The filter frame 72 is formed from resinous material such as polypropylene into an approximately rectangular shape, which is surrounded by four sides including two pairs of opposite sides. The filter frame 72 has a curved plate-like shape that is convexly curved toward the upstream side of the fluid flow direction. The filter frame 72 is provided with a plurality of fluid passage holes (window portions) 74 therein, which are divided by the bridge portion 73. The filter frame 72 is provided with: a left and right sides that are located on both sides of the straight sides of the mesh filter 9; and a top and bottom sides that are located on both sides of the curved sides of the mesh filter 9. The left and right sides of the filter frame 72 are inserted in and fitted to a pair of fitting grooves 47, which are provided on the side surface of the depressed portion 42 of the valve case 4. Thus, the mesh filter 9 is installed in the filter-housing space 43 of the housing 3 to block the fluid flow passage of the housing 3.

The bridge portion 73 extends from the top side to the bottom side of the filter frame 72. A plurality of the fluid passage holes 74 are opening portions to pass the fluid such as vaporized fuel therethrough. The curved surface of the mesh sheet 71 is exposed in the fluid passage holes 74. The fluid passage holes 74 communicate an upstream aide portion and a downstream side portion of the filter-housing space 43, which is provided on the way of the fluid flow passage to the valve hole 36 of the electromagnetic valve 1, with each other. The fluid passage holes 74 have rounded corners. Alternatively, the fluid passage holes 74 may have right-angled corners. In a case that an elastic sheet-shaped mesh filter (mesh sheet) serves as the mesh filter 9, the mesh filter 9 is elastically bended with ease when an external force acts on the mesh filter 9 in a direction to pinch and bend the mesh filter 9. When the left and right sides of the filter frame 72 is attached to a pair of the fitting grooves 47 to keep the mesh filter 9 bended, the mesh filter 9 is ready to restore to its original shape, so that the left and right sides of the filter frame 72 of the mesh filter 9 come in intimate contact with the bottom surfaces of pair of fitting grooves 47. Accordingly, the mesh filter 9 can be easily installed in the housing 3, to seal a gap between the bottom surfaces of a pair of fitting grooves 47 and the left and right sides of the filter frame 72.

In the following are described actions of the electromagnetic valve 1 according to the first embodiment of the present invention, referring to FIGS. 1 to 4.

In the electromagnetic valve 1, the ECU controls the time to energize the solenoid coil 2, to change an opening area (opening degree) of the valve hole 36, which corresponds to the lift amount of the valve element 6, to adjust the purge flow amount of the fluid such as vaporized fuel introduced from the canister 12 to the engine intake pipe 13. A long time to energize the solenoid coil 2 increases an average current flowing through the solenoid coil 2, so that the moving core 53 moves toward the attracting portion of the stator core 51 against the spring force of the coil spring 8. Then, the lift amount of the valve element 6 increases in accordance with the movement of the moving core 53, to increase the valve opening degree and the purge flow amount. A short time to energize the solenoid coil 2 decreases the average current flowing through the solenoid coil 2, so that the spring force of the coil spring 8 pushes the moving core 53 backward. Then, the lift amount of the valve element 6 decreases in accordance with the movement of the moving core 53, to decrease the valve opening decree and the purge flow amount.

Specifically, the ECU controls the electromagnetic valve driving circuit to supply the solenoid coil 2 with exciting current, to generate magnetic flux around the solenoid coil 2. The magnetic flux generated around the solenoid coil 2 penetrates the stator core 51, the yoke 52 and the moving core 53; Thus, the stator core 51, the yoke 52 and the moving core 53 are magnetically excited, i.e., magnetized, so that the moving core 53 is attracted to the attracting portion of the stator core 51. Accordingly, the moving core 53 starts moving from a state to push the valve element onto the valve seat portion 20 of the valve seat 5 toward the attracting portion of the stator core 51 by the spring force (urging force) of the coil spring 8.

When the moving core 53 moves closer to the attracting portion of the stator core 51, the valve element 6 is lifted off the valve seat portion 20 of the valve seat 5. Thus, the valve hole 36 is opened, to transmit the negative pressure in the intake pipe to the canister 12. Then, the vaporized fuel desorbed from the adsorbent in the canister 12 flows from the canister 12 via the upstream portion of the fluid introduction passage 15, the inlet port 33 of the electromagnetic valve 1, the fluid-introducing flow passage 34, the chamber 41, the upstream portion of the filter-housing space 43, the mesh filter 9, the downstream portion of the filter-housing space 43, the annular space 44, the annular space 45, the valve chamber 46, the valve hole 36, the fluid-discharging flow passage 37, the outlet port 39 of the electromagnetic valve 1, the downstream portion of the fluid introduction passage 15 to be introduced (purged) to the engine intake pipe 13.

When the electromagnetic valve 1 is opened, the mesh sheet 71 of the mesh filter 9 captures foreign matters, which are contained in the fluid such as vaporized fuel that flows toward the valve element 6, such as an adsorbent that is supported in the canister 12 and fine-grained by an engine vibration, dusts that has entered in the fuel tank 11 during a refueling, or dusts that is suspended in the air and has entered through the vent hole of the canister 12. Thus, the foreign matters contained in the fluid such as vaporized fuel is prevented from entering into magnetic gaps between the valve seat portion 20 of the valve seat 5 and the valve element 6, between the sliding bore 59 of the stator core 51 and the sliding portion 61 of the moving core 53, or between the attracting portion of the stator core 51 and the moving core 53. Thus, the sealing performance between the valve seat portion 20 and the valve element 6 is not decreased, not to cause malfunctions or adhesion failures of the valve element 6 and the moving core 53.

When a power distribution to the electromagnetic valve 1 is stopped, the spring force of the coil spring 8 returns the moving core 53 to its initial position. Thus, the valve element 6 comes in an intimate contact with and seals the valve seat portion 20 in accordance with the movement of the moving core 53. Accordingly, a closed space of the fluid introduction passages 14, 15 of the evaporative emission control system, which includes the fuel tank 11, is airtightly enclosed.

As described above, in the electromagnetic valve 1 according to the first embodiment, the coil assembly 7, which includes the solenoid coil 2, the resin case 55 and the coil bobbin 56, is arranged in the fluid flow passage formed in the housing 3. Further, the mesh filter 9 is installed to close the filter-housing space 43, which is on the upstream side of the coil assembly 7 in the fluid flow direction. Specifically, a cylindrical resin case 55, which covers and protects a radially outer side of the coil assembly 7, is integrally formed from resin with the cylindrical portion 22 of the valve case 4. Further, the cylindrical outer circumferential surface of the resin case 55 is provided with a heatsink portion 65, which is exposed to the filter-housing space (fluid flow passage) 43 of the housing 3 to radiate heat. Furthermore, a mesh filter 9 is installed to close the upstream portion of the filter-housing space 43 than the heatsink portion 65.

Accordingly, the fluid, which has flown from the inlet port 33 of the electromagnetic valve 1 via the fluid-introducing flow passage 34, the chamber 41 into the filter-housing space 43, hits on the convexly curved surface of the mesh filter 9. That is, the fluid, which has flown from the upstream side in the fluid flow direction, hits on the convexly curved surface of the mesh filter 9, to diffuse the fluid to expose a large area of the heatsink portion 65 in the fluid. Accordingly, it is possible to cool the relatively large area of the coil portion of the solenoid coil 2 via the heatsink portion 65. Thus, the heat generated in the solenoid coil 2 by energizing the solenoid coil 2, can be efficiently radiated via the heatsink portion 65 into the fluid flowing through the filter-housing space 43 of he heatsink portion 65.

In the electromagnetic valve 1 according to the first embodiment, the chamber 41, which has a relatively large volume in the fluid flow passage formed in the housing 3, is provided at the upstream side of the mesh filter 9 in the fluid flow direction. Thus, the fluid, which has flown from the upstream side of the mesh filter 9 in the fluid flow direction, is diffused in the chamber 41, and then further diffused in hitting on the mesh filter 9, so that it is possible to cool a further large area of the coil. Accordingly, a heat radiation performance of the solenoid coil 2 is improved without an increase of the surface area of the coil portion of the solenoid coil 2, that is, without upsizing the solenoid coil 2, so that it is possible to cool the solenoid coil 2 more efficiently.

Accordingly, it is possible to prevent the solenoid coil 2 from being excessively heated, to limit a heat degradation of the electromagnetic circuit parts such as the lead wires, the coil bobbin 56, the stator core 51, the moving core 53, etc. Specifically, the reliability of the electromagnetic driving portion is not spoiled by durability temperature excesses of the resinous parts such as the resin case 55 that coats the solenoid coil 2, the insulating coating on the surface of the lead wire and the coil bobbin 56 on which the lead wire is wound, and/or the exfoliations of the plating or DLC layers on the surface of the sliding bore 59 of the stator core 51, or lubricants that coats the surface of the sliding portion 61 of the moving core 53. As a result, it is possible to prevent the heat degradation and a durability decrease of the electromagnetic valve 1 due to the overheating of the solenoid coil 2. Further, the valve element 6 and the moving core 53 securely move for a long term, to improve the control response performance and the operational reliability of the electromagnetic valve 1.

The mesh filter 9 is installed to cover at least a part of the cylindrical surface of the cylindrical portion 22 of the valve case 4 and the heat radiation surface of the heatsink portion 65 of the resin case 55 in the circumferential direction. Thus, the diffused fluid hits on the heatsink portion 65, which is in closest proximity to the side surface of the coil portion of the solenoid coil 2. Accordingly, a larger area of the coil portion of the solenoid coil 2 can be cooled via the heatsink portion 65, so that the heat generated in the energized solenoid coil 2 can be effectively radiated to the fluid flowing through the filter-housing space 43 via the heatsink portion 65. As a result, the solenoid coil 2 is provided with an improved heat radiation performance without increasing the heat radiation area, i.e., the surface area of the coil portion of the solenoid coil 2, that is, without upsizing the solenoid coil 2. Thus, it becomes possible to cool the solenoid coil 2 more efficiently. Further, the elastic sheet-shaped mesh filter 9 is bended and installed along the shapes of the cylindrical surface of the cylindrical portion 22 of the valve case 4 and the heat radiation surface of the resin case 55 of the electromagnetic driving portion, that is, along the shape of the radially outer side surface of the coil portion of the solenoid coil 2. Thus, it become possible to extend the surface area of the mesh filter 9 without upsizing the housing 3, so that the electromagnetic valve 1 can be downsized.

When a power distribution to the solenoid coil 2 is repeatedly started and stopped to open and close the valve element 6 of the electromagnetic valve 1 at high frequencies, the valve element 6 seated on and lifted off the valve seat portion 20 of the valve seat 5 generates flow noises. Further, when the spring force of the coil spring 8 rapidly seats the valve element 6 on the valve seat portion 20 of the valve seat 5 in accordance with the power distribution stop to the solenoid coil 2, the valve element 6 rapidly seated on the valve seat portion 20 of the valve seat 5 generates pulsation noises. The electromagnetic valve 1 according to the first embodiment is provided with the chamber 41, which has the relatively large volume in the fluid flow passage formed in the housing 3, at the upstream side of the mesh filter 9 in the fluid flow direction. Thus, the chamber 41 can deaden the flow noise and the pulsation noise passed through the mesh sheet 71 of the mesh filter 9, to improve the noise deadening effect of the electromagnetic valve 1. That is, the electromagnetic valve 1 can reduce the flow noise generated by the opening and closing operations of the valve element 6 and the pulsation noise generated by the rapid close of the valve element 6 within itself. Accordingly, it is not necessary to install supplementary devices such as a silencer on the engine intake pipe 13, etc., to simplify the construction of the evaporative emission control system.

Modified Embodiment

In the above-described embodiment, the present invention is applied to the electromagnetic valve that is incorporated in the evaporative emission control system of vehicles. The electromagnetic valve according to the present invention is not limited to this, and may be applied to electromagnetic fluid flow quantity control valves, electromagnetic fluid pressure control valves, and the other kinds of electromagnetic valve. The electromagnetic valve according to the present invention is applicable not only to gas fluids such as air, vaporized gas, etc., but also to gas coolant, liquids fluids such as water, fuel, oil, liquid coolant, etc., and biphasic gas-liquid fluid. The valve lift amount may be configured to become large or small as the voltage or current distributed to the coil increases.

The electromagnetic valve 1 according to the first embodiment is provided with: a housing in which a fluid flow passage is formed; a valve element 6 that is seated on and lifted off the valve seat portion 20 of the housing 3 to open and close a valve hole 36 provided on the way of the fluid flow passage; an electromagnetic driving portion that generates an magnetic attraction force to attract the valve element 6 to a valve-closing side to open the valve hole 36 or to a valve-closing side to open the valve hole 36; and a valve element urging means such as a coil spring 8 that generates an urging force (urging load) to urge the valve element 6 to the valve-closing side or to a valve-opening side. A filter is installed to close an upstream side portion of the fluid passage than the valve hole 36 in the fluid flow direction. The valve element urging means may be eliminated.

In the first embodiment, the electromagnetic valve 1 is an electromagnetic flow quantity control valve. Alternatively, the electromagnetic valve according to the present invention may be applied to an electromagnetic opening/closing valve. In this case, the magnetic attraction force of the solenoid coil 2 attracts the moving core 53 to one axial side to move the valve element 6 away from the valve seat portion 20, and the valve element 6 is totally opened in accordance with the movement of the moving core 53. In the valve-opening time, the valve element 6 is lifted off the valve seat portion 20 to open the valve hole 36. Further, the spring force of the coil spring 8 urges the moving core 53 to the other axial side to push the valve element 6 onto the valve seat portion 20, and the valve element 6 is totally closed in accordance with the movement of the moving core 53. In this valve-closing time, the valve element 6 is seated on the valve seat portion 20 to close the valve hole 36. The electromagnetic valve according to the present invention may be applied not only to a normally-closed electromagnetic valve but also to a normally-opened electromagnetic valve. A Moving core such as an armature may substitute for the moving core 53. A coupling member such as a valve shaft or a plunger may be interposed between the moving core and the valve element 6.

In the first embodiment, the flexible sheet-shaped mesh filter 9 is used as the filter. However, a stiff sheet-shaped mesh filter may be used as the filter. The filter may be provided with a filter element that captures foreign matters contained in the fluid flowing through the fluid flow passage of the housing. In this case, it is possible to form the filter element in an approximately square, rectangular, oblongly circular or elliptic shape and support the periphery of the filter element with a frame element having an approximately square, rectangular, oblongly circular or elliptic shape to increase a stiffness of the filter. The filter element may be formed from bellows-like filter element such as filter paper or filter fabric, or thin mesh-like or honeycomb-like sheet. The filter element may be formed from metallic material or resinous material.

A frame element may cover and hold the periphery of the filter element to increase the stiffness of the filter. The frame element having the rectangular hoop portion and the bridge portion (lattice portion, cross bridge, straight bridge) located in the rectangular hoop portion may be integrally formed from metallic material or resinous material. The filter element may be sandwiched between a plurality of sheet-shaped frame elements. The cross-sectional shape of the filter may be convexed or angled toward the upstream side of the fluid flowing through the fluid flow passage. The angled cross-sectional shape of the filter may include one angled step or a plurality of angled steps.

In the first embodiment, a pair of the fitting grooves 47 are integrally formed on the passage sidewall of the housing 3. Alternatively, a pair of the fitting grooves 47 may be provided on a filter holding frame that is separately formed from the passage sidewall of the housing 3. The filter holding frame is an approximately square, rectangular or angled hoop-shaped part. A front and rear shapes of the filter frame 72 of the mesh filter 9, which are the shapes seen from the upstream side or downstream side in the fluid flow direction, may be formed in a shape having at least two opposed and parallel sides, such as oblong circular, trapezoidal, or parallelogrammatic shape, so that the two opposed sides are inserted into a pair of fitting grooves.

In the first embodiment, the cylindrical outer circumferential surfaces of the cylindrical portion 22 of the valve case 4 and the resin case 55 of the electromagnetic driving portion are provided with the heatsink portion 65. The heatsink portion 65 is exposed to the filter-housing space 43 to radiate the heat generated in the solenoid coil 2 to the fluid flowing through the filter-housing space, that is, the fluid flow passage of the housing 3. Alternatively, the radially outer side surface of the solenoid coil 2 may be exposed to the fluid flow passage of the housing 3 to radiate the heat generated in the solenoid coil 2 directly to the fluid flowing through the fluid flow passage. In this case, the solenoid coil 2 is located in the fluid flow passage, and the radially outer side surface of the solenoid coil 2 serves as a heat radiation portion (heat radiation surface), and the filter is located to block the fluid flow passage on the upstream side of the coil in the fluid flow direction.

In the first embodiment, the heatsink portion (heat radiation surface) 65, which is for radiating the heat generated in the solenoid coil 2 to the fluid flowing through the fluid flow passage formed in the housing 3, extends along the radially outer side surface, or the cylindrical outer circumferential surface of the solenoid coil 2. Alternatively, the heatsink portion may be provided around the solenoid coil 2, that is, along the entire circumference the radially outer side surface of the solenoid coil of the solenoid coil 2 or along both axial end surfaces of the solenoid coil 2, for example. Further, the heatsink portion (heat radiation portion) 65, which is for radiating the heat generated in the solenoid coil 2 to the fluid flowing through the fluid flow passage formed in the housing 3, may be provided along a part of the radially inner side circumferential surface of the solenoid coil 2, along an entire radially inner side circumferential surface of the solenoid coil 2 or along both axial end of the solenoid coil 2. For example, the fluid flow passage may be formed between the outer circumference of the stator core and the inner circumference of the coil bobbin. Further, it is possible to provide a heatsink plate formed from metallic or resinous material that has a larger thermal conductivity than the resin case 55 as an inserting part insert molded in the resin case 55 to locate one end of the heatsink plate in an intimate contact with the coil portion of the solenoid coil 2 and to expose the other end of the heatsink plate to the fluid flow passage of the housing 3.

In the first embodiment, the cylindrical portion 22 of the valve case 4 and the resin case 55 of the electromagnetic driving portion are integrally formed from resinous material. Alternatively, the cylindrical portion 22 of the valve case 4 and the resin case 55 of the electromagnetic driving portion may be separated from each other. In the first embodiment, the surface insulation-coated lead wire is wound on a resin bobbin 56. Alternatively, the coil bobbin may be a metallic bobbin.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic valve comprising:
   a housing that forms a fluid flow passage therein;
   a valve element that is installed in the housing to control a flow of a fluid through the fluid flow passage;
   an electromagnetic driving portion that is installed in the housing to generate a magnetic attraction force when it is energized to actuate the valve element, at least a part of the electromagnetic driving portion being within the fluid flow passage; and
   a filter that is installed in the fluid flow passage on an upstream side of the part of the electromagnetic driving portion within the fluid flow passage to filtrate the fluid flowing through the fluid flow passage,
   wherein the electromagnetic driving portion has a radially outside surface, the filter has a curved portion extending over at least a part of the radially outside surface of the electromagnetic driving portion, and the curved portion is curved convexly toward an upstream side of a flow direction of the fluid flowing through the fluid flow passage.

2. The electromagnetic valve according to claim 1, wherein the part of the electromagnetic driving portion within the fluid flow passage comprises a heatsink to exchange a heat between the electromagnetic driving portion and the fluid in the fluid flow passage.

3. The electromagnetic valve according to claim 2, wherein the filter is installed to extend over at least a part of said heat sink.

4. The electromagnetic valve according to claim 1, wherein:
   the electromagnetic driving portion is integrally connected to the housing; and
   the housing has a heatsink to exchange a heat between the electromagnetic driving portion and fluid in the fluid flow passage.

5. The electromagnetic valve according to claim 1, wherein the electromagnetic driving portion has a solenoid coil.

6. The electromagnetic valve according to claim 5, wherein the heatsink extends over at least a part of the solenoid coil.

7. The electromagnetic valve according to claim 5, wherein the heatsink overlaps at least a part of the solenoid coil in an axial direction of the solenoid coil.

8. The electromagnetic valve according to claim 1, wherein the fluid flow passage has a fluid accumulation space on an upstream side of the filter.

9. The electromagnetic valve according to claim 1, wherein the electromagnetic driving portion has a stator core that has a sliding bore therein and a moving core that is slidably inserted in the sliding bore to move together with the valve element, the stator core and the moving core being located on a downstream side of the filter.

10. The electromagnetic valve according to claim 1, wherein the radially outside surface of the electromagnetic driving portion has an approximately cylindrical shape.

11. The electromagnetic valve according to claim 1, wherein the filter comprises a filter element and a filter frame covering and holding a periphery of the filter element.

12. The electromagnetic valve according to claim 11, wherein the filter frame has a rectangular hoop portion and a bridge portion located in the rectangular hoop portion.

13. The electromagnetic valve according to claim 12, wherein the rectangular hoop portion and the bridge portion are integrally formed.

* * * * *